United States Patent
Wang

(10) Patent No.: US 10,576,528 B2
(45) Date of Patent: Mar. 3, 2020

(54) STEEL BAR TRANSVERSE STEPPING CONVEYING EQUIPMENT AND CONTROL METHOD

(71) Applicant: BEIJING WU LONGXING TECHNOLOGY DEVELOPMENT CO., LTD., Beijing (CN)

(72) Inventor: Kaiyu Wang, Beijing (CN)

(73) Assignee: BEIJING WU LONGXING TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/325,396

(22) PCT Filed: Jul. 21, 2017

(86) PCT No.: PCT/CN2017/093773
§ 371 (c)(1),
(2) Date: Feb. 14, 2019

(87) PCT Pub. No.: WO2018/032932
PCT Pub. Date: Feb. 22, 2018

(65) Prior Publication Data
US 2019/0210091 A1    Jul. 11, 2019

(30) Foreign Application Priority Data
Aug. 16, 2016  (CN) .......................... 2016 1 0674215

(51) Int. Cl.
*B21F 23/00*    (2006.01)
*B65G 25/02*    (2006.01)

(52) U.S. Cl.
CPC .............. *B21F 23/00* (2013.01); *B65G 25/02* (2013.01)

(58) Field of Classification Search
CPC ................................ B65G 25/02; B21F 23/00
(Continued)

(56) References Cited

U.S. PATENT DOCUMENTS 3,143,217 A * 8/1964 Andersen ............... B65G 25/02
                                                         198/468.6
3,961,703 A    6/1976 McKeever
(Continued)

FOREIGN PATENT DOCUMENTS

CN        101905269 A    12/2010
CN        105499446 A     4/2016
(Continued)

*Primary Examiner* — Mark A Deuble
(74) *Attorney, Agent, or Firm* — Bayramoglu Law Offices LLC

(57) ABSTRACT

A steel bar transverse stepping conveying equipment is provided, including a base, and a front movable clamp area and a rear fixed clamp area arranged on the base. The front movable clamp area and the rear fixed clamp area are connected by a rear fixed clamp area connecting guiderail mechanism for relative translation. A method for controlling the steel bar transverse stepping conveying equipment is further provided. The steel bar transverse stepping conveying equipment is provided with a plurality of clamp mechanisms. A front-movable-clamp-area clamp clamps the steel bar and shifts the steel bar to a next position step by step; then the steel bar is clamped by a rear fixed clamp area clamp, and the front-movable-clamp-area clamp is released and returned to an original position; and the previous action is repeated until the stepping conveying of the steel bar is completed.

10 Claims, 13 Drawing Sheets

(58) Field of Classification Search
USPC .............. 198/75.011, 750.14, 773–774.3
See application file for complete search history.

(56) References Cited

U.S. PATENT DOCUMENTS

| | | | | |
|---|---|---|---|---|
| 4,363,395 A * | 12/1982 | Mink | ................. | B65G 25/02 |
| | | | | 198/468.2 |
| 4,534,696 A * | 8/1985 | Ensminger | ........... | B65G 47/901 |
| | | | | 198/468.2 |
| 4,681,210 A | 7/1987 | Miki et al. | | |
| 4,687,092 A * | 8/1987 | Ray | ................. | B65G 47/31 |
| | | | | 198/459.1 |
| 5,374,157 A * | 12/1994 | Allard | ................. | B27B 31/00 |
| | | | | 198/774.3 |
| 5,454,466 A * | 10/1995 | Galarowic | ............. | B65G 25/02 |
| | | | | 198/751 |
| 5,613,595 A * | 3/1997 | Ukada | ................. | B65G 25/02 |
| | | | | 198/774.3 |
| 6,223,885 B1 * | 5/2001 | Markiewicz | ............ | B21C 47/24 |
| | | | | 198/463.3 |
| 6,364,093 B1 * | 4/2002 | LaBolt | ................. | B65G 25/02 |
| | | | | 198/775 |
| 2015/0060237 A1 * | 3/2015 | Ge | ................. | B65G 47/907 |
| | | | | 198/750.11 |

FOREIGN PATENT DOCUMENTS

| | | |
|---|---|---|
| CN | 106270307 A | 1/2017 |
| CN | 206009690 U | 3/2017 |
| EP | 0562837 A1 | 9/1993 |
| TW | M485096 U | 9/2014 |

\* cited by examiner

US 10,576,528 B2

STEEL BAR TRANSVERSE STEPPING CONVEYING EQUIPMENT AND CONTROL METHOD

CROSS REFERENCE TO THE RELATED APPLICATIONS

This application is the national phase entry of International Application No. PCT/CN2017/093773, filed on Jul. 21, 2017, which is based upon and claims priority to Chinese Patent Application No. 201610674215.0, filed on Aug. 16, 2016, the entire contents of which are incorporated herein by reference.

TECHNICAL FIELD

The present invention relates to the technical field of steel bar conveying equipment, in particular, to steel bar transverse stepping conveying equipment that has a simple structure, is easy to operate, transfers steel bars accurately and efficiently, and can greatly reduce labor costs and a method for controlling the same.

BACKGROUND

Currently, steel bars need to be manually arranged on processing equipment or a processing working platform one by one before processing. Such a method has low working efficiency and high labor costs. To resolve this problem, there are some patent documents related to automatic steel bar transfer equipment. Such equipment occupies a large area and has a complex structure, high manufacturing costs, and low efficiency.

SUMMARY

The objective of the present invention is to provide steel bar transverse stepping conveying equipment that has a simple structure, is easy to operate, transfers steel bars accurately and efficiently, and can greatly reduce labor costs and a method for controlling the same.

The technical solution of the present invention is as follows: A steel bar transverse stepping conveying equipment includes a base (1), wherein a front movable clamp area (2) and a rear fixed clamp area (3) are provided on the base (1), and the front movable clamp area (2) and the rear fixed clamp area (3) are connected through rear-fixed-clamp-area connecting guiderail mechanisms (4) to perform a relative translational movement;

the front movable clamp area (2) is consists of a front-movable-clamp-area clamp (5), a front-movable-clamp-area left-right moving plate (6), and a front-movable-clamp-area up-down moving plate (7), the front-movable-clamp-area clamp (5) is fixedly connected to the front-movable-clamp-area up-down moving plate (7), and the front-movable-clamp-area left-right moving plate (6) is mounted on a back surface of the front-movable-clamp-area up-down moving plate (7) and is movably connected to the front-movable-clamp-area up-down moving plate (7); and the rear fixed clamp area (3) consist of a rear-fixed-clamp-area clamp device (8) and a rear-fixed-clamp-area fixed plate (9), the rear-fixed-clamp-area clamp device (8) is mounted on the rear-fixed-clamp-area fixed plate (9), and the rear-fixed-clamp-area clamp device (8) consist of a rear-fixed-clamp-area clamp (10) and a rear-fixed-clamp-area clamp guide plate (11).

An inclined groove (14) is provided in the rear-fixed-clamp-area clamp guide plate (11), the rear-fixed-clamp-area clamp (10) is embedded in the inclined groove (14), and a rear-fixed-clamp-area clamp power device (12) of the rear-fixed-clamp-area clamp device (8) lifts the rear-fixed-clamp-area clamp guide plate (9) to implement transverse clamping and releasing of the rear-fixed-clamp-area clamp (10) along the inclined groove (14).

1, 2, 3, . . . , n rear-fixed-clamp-area clamp devices (8) are provided, 2, 3, 4, . . . , n+1 front-movable-clamp-area clamps (5) are correspondingly provided, and the rear-fixed-clamp-area clamp devices (8) and the front-movable-clamp-area clamps (5) are transversely distributed at an equal distance.

The rear-fixed-clamp-area clamp guide plate (9) is consist of a front guide plate and a rear guide plate which are symmetrically arranged.

The rear-fixed-clamp-area connecting guiderail mechanisms (4) between the front movable clamp area (2) and the rear fixed clamp area (3) are connected through a transverse guiderail; the front-movable-clamp-area left-right moving plate (6) and the front-movable-clamp-area up-down moving plate (7) are connected through a longitudinal guiderail; the rear-fixed-clamp-area fixed plate (9) and the rear-fixed-clamp-area clamp guide plate (11) are connected through a longitudinal guiderail; and the rear-fixed-clamp-area clamp (10) and the rear-fixed-clamp-area fixed plate (9) are connected through a transverse guiderail.

The front-movable-clamp-area clamp (5) implements clamping and releasing using a front-movable-clamp-area clamp power device (15).

The power devices and the clamp devices of the front movable clamp area (2) and the rear fixed clamp area (3) are controlled by a programmable logic controller (PLC) pneumatically, hydraulically or electrically.

A method for controlling steel bar transverse stepping conveying equipment, including the following steps:

(1) in step 1: a front-movable-clamp-area clamp (5) is located at a lower end of a steel bar and is in an open state, and then a front-movable-clamp-area up-down moving plate (7) drives the front-movable-clamp-area clamp (5) to ascend;

(2) in step 2: the front-movable-clamp-area clamp (5) ascends to a position on a level with a rear-fixed-clamp-area clamp (10) and then performs a clamping movement, and the front-movable-clamp-area clamp (5) then holds the steel bar tightly to ascend together;

(3) in step 3: the front-movable-clamp-area clamp (5) holds the steel bar tightly, and they are lifted together to a highest position, and a front-movable-clamp-area left-right moving plate (6) drives the front-movable-clamp-area clamp (5) and the steel bar to transfer together to the left;

(4) in step 4: the front-movable-clamp-area clamp (5) and the steel bar are transferred together to the left, and the front-movable-clamp-area up-down moving plate (7) then drives the front-movable-clamp-area clamp (5) and the steel bar to descend;

(5) in step 5: the front-movable-clamp-area clamp (5) and the steel bar descend to an opening position of the rear-fixed-clamp-area clamp (10), the rear-fixed-clamp-area clamp (10) holds the steel bar tightly, and the front-movable-clamp-area clamp (5) then releases the steel bar;

(6) in step 6: the front-movable-clamp-area clamp (5) descends to a lowest position, and the front-movable-clamp-area clamp (5) moves rightwards to an original position; and (7) in step 7: step 1 to step 6 are repeated, until the steel bar is transferred to a target position.

The beneficial effect of the present invention is as follows: in the steel bar transverse stepping conveying equipment, a front movable clamp area and a rear fixed clamp area are provided on a base and are connected through rear-fixed-clamp-area connecting guiderail mechanisms to perform a relative translational movement.

In the steel bar transverse stepping conveying equipment, a plural f groups of clamp mechanisms are arranged. Movable clamps hold a steel bar tightly and transfer the steel bar to a next position step by step in succession, and then fixed clamps hold the steel bar tightly, and the movable clamps release the steel bar, return to an initial position, and repeat the previous movement, until a step-by-step transfer movement of the steel bar is completed.

The present invention has a simple structure and low manufacturing costs, occupies a small area, and can improve the working efficiency.

The present invention is further described below with reference to the accompanying drawings and embodiments.

DETAILED DESCRIPTION OF EMBODIMENTS

Figure 1:
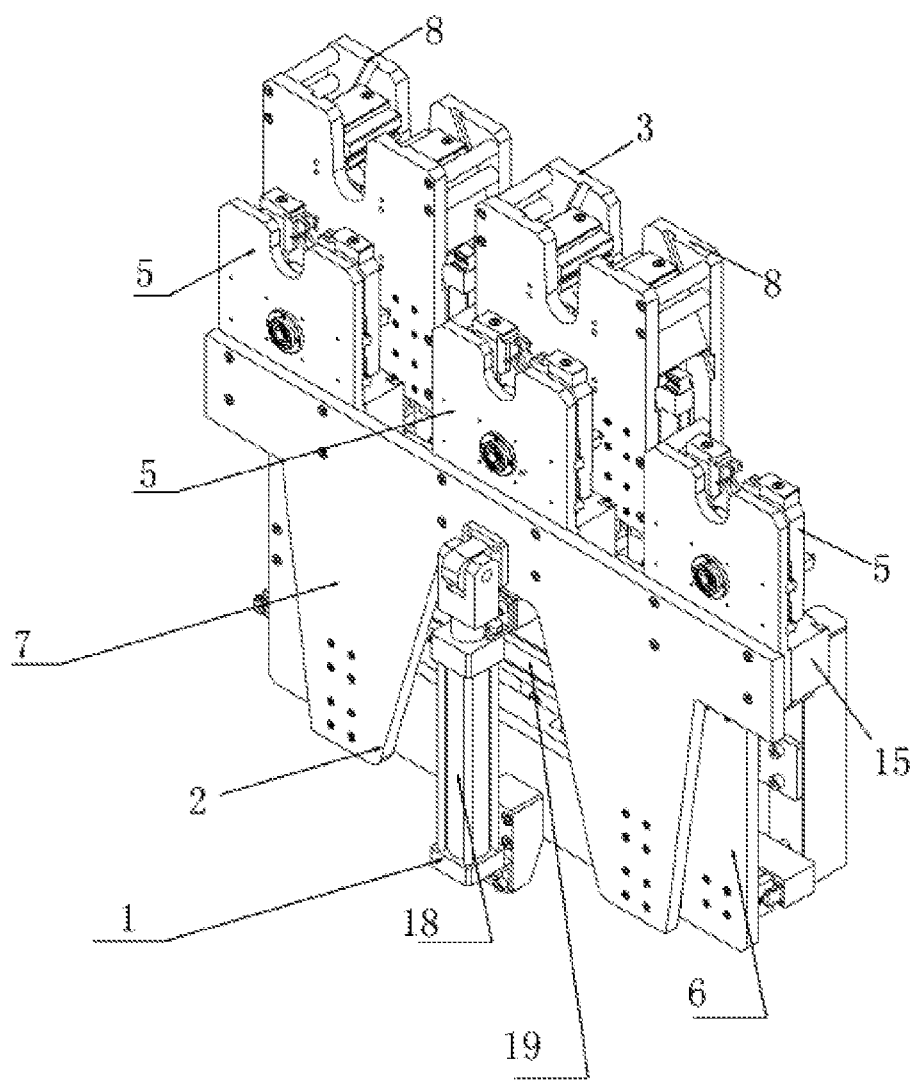
FIG. 1 is a schematic structural diagram according to the present invention.

In FIG. 1, steel bar transverse stepping transfer equipment includes a base 1. A front movable clamp area 2 and a rear fixed clamp area 3 are provided on the base 1 and are connected through rear-fixed-clamp-area connecting guiderail mechanisms 4 to perform a relative translational movement.

The front movable clamp area 2 consists of a front-movable-clamp-area clamp 5, a front-movable-clamp-area left-right moving plate 6, and a front-movable-clamp-area up-down moving plate 7. The front-movable-clamp-area clamp 5 is fixedly connected to the front-movable-clamp-area up-down moving plate 7. The front-movable-clamp-area left-right moving plate 6 is mounted on a back surface of the front-movable-clamp-area up-down moving plate 7 and is movably connected to the front-movable-clamp-area up-down moving plate 7.

Figure 2:
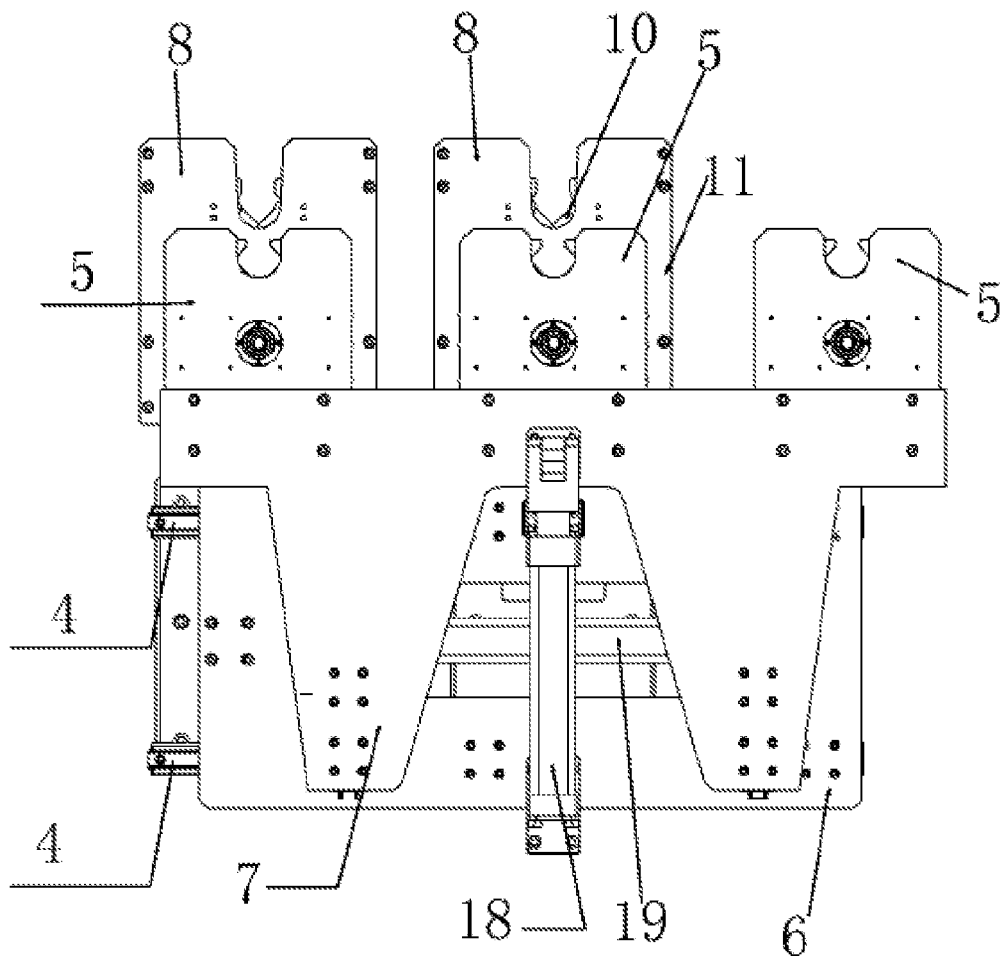
FIG. 2 is a front view of FIG. 1.
Figure 3:
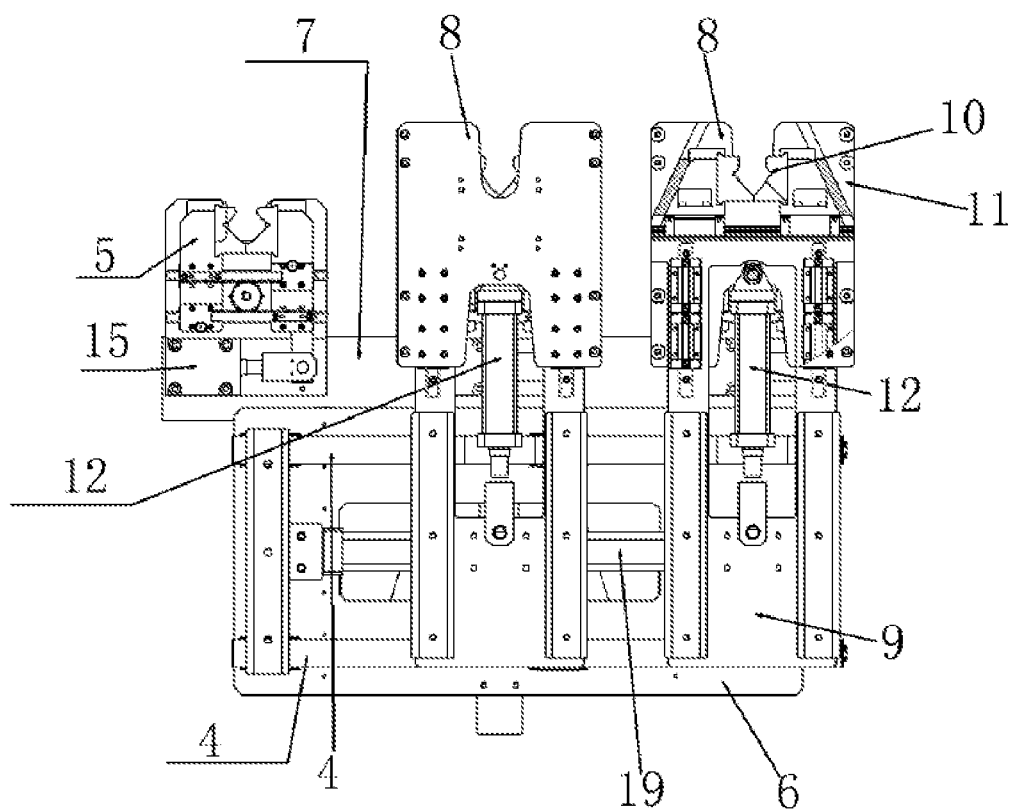
FIG. 3 is a rear view of FIG. 1.
Figure 4:
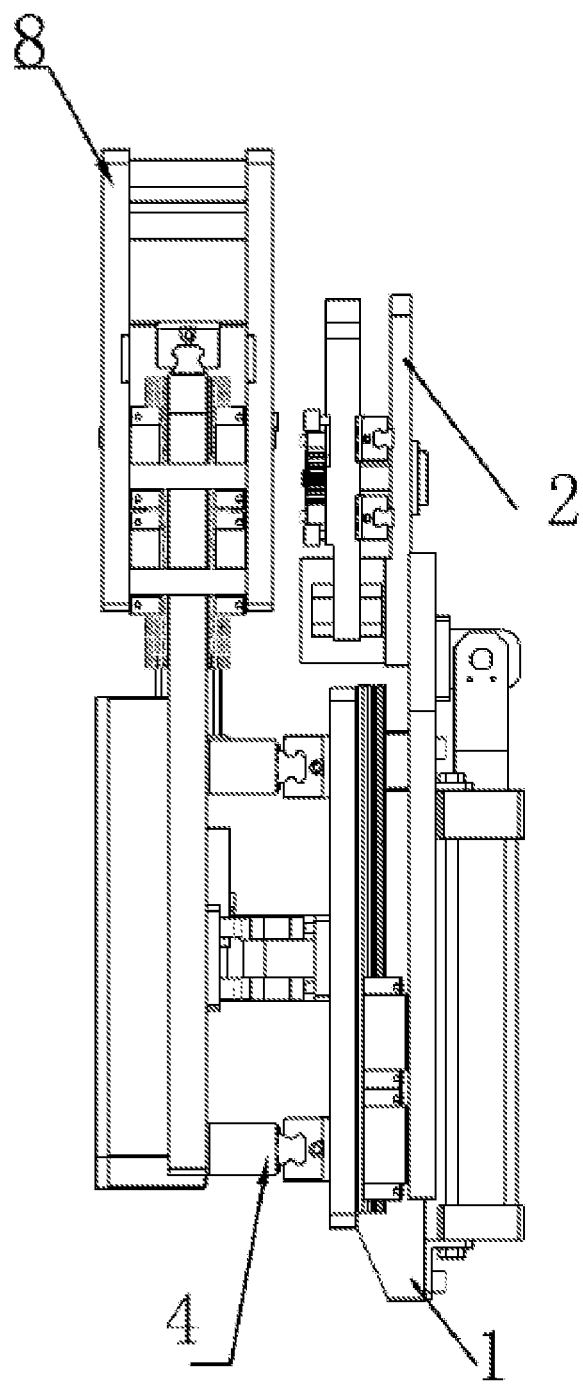
FIG. 4 is a side view of FIG. 1.

The rear fixed clamp area 3 consists of a rear-fixed-clamp-area clamp device 8 and a rear-fixed-clamp-area fixed plate 9. The rear-fixed-clamp-area clamp device 8 is mounted on the rear-fixed-clamp-area fixed plate 9. The rear-fixed-clamp-area clamp device 8 consists of a rear-fixed-clamp-area clamp 10 and a rear-fixed-clamp-area clamp guide plate 11 (referring to FIG. 2, FIG. 3, and FIG. 4).

Figure 5:
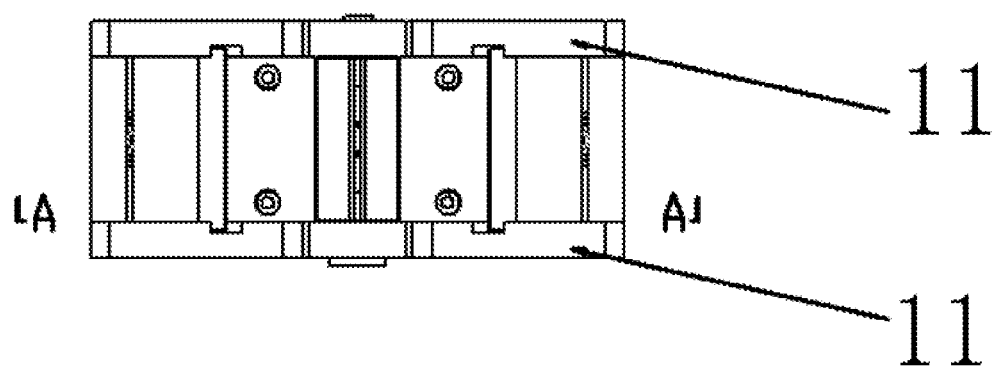
FIG. 5 is a schematic diagram of a rear-fixed-clamp-area clamp device when a rear-fixed-clamp-area clamp is in a holding state.
Figure 6:
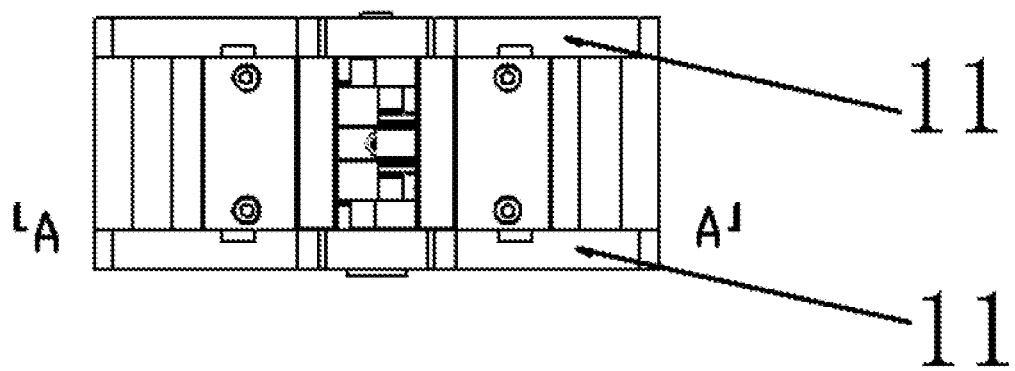
FIG. 6 is a schematic diagram of a rear-fixed-clamp-area clamp device when a rear-fixed-clamp-area clamp is in an open state.
Figure 7:
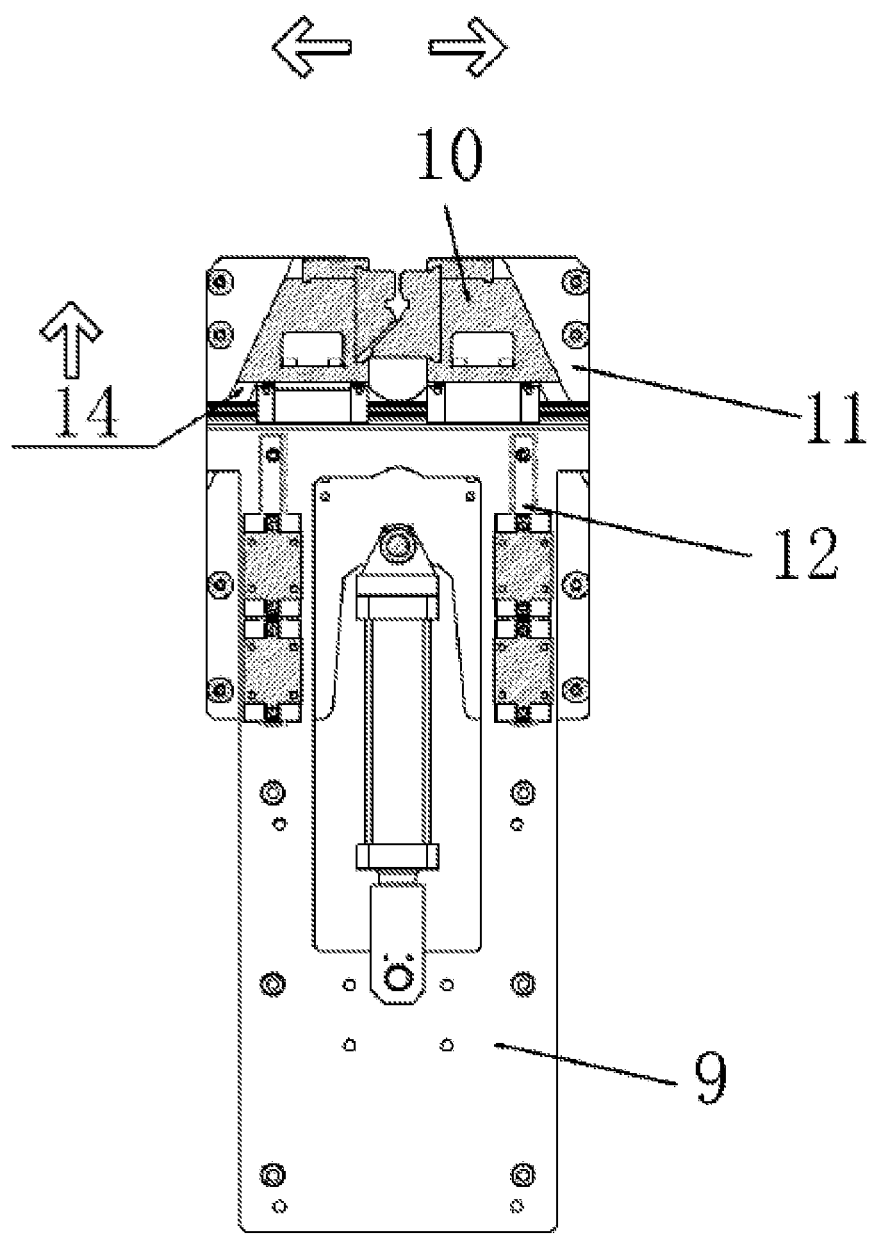
FIG. 7 is a view in a direction A-A of FIG. 5.
Figure 8:
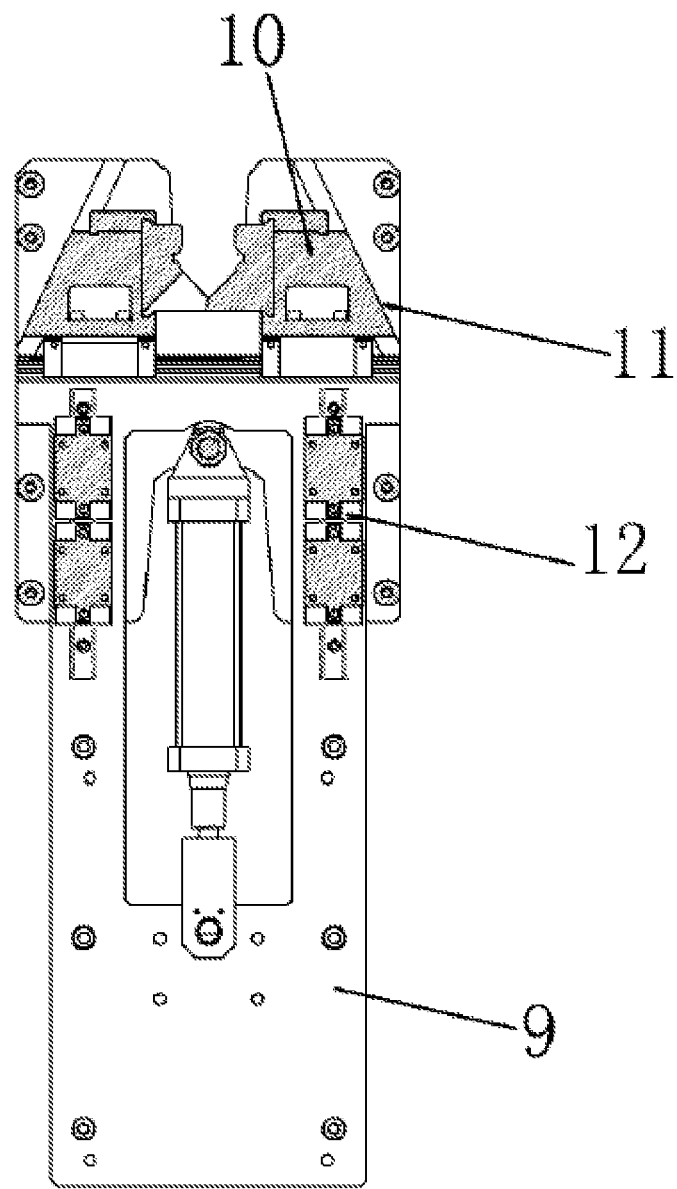
FIG. 8 is a view in a direction A-A of FIG. 6.

An inclined groove 14 is provided in the rear-fixed-clamp-area clamp guide plate 11. The rear-fixed-clamp-area clamp 10 is embedded in the inclined groove 14. A rear-fixed-clamp-area clamp power device 12 of the rear-fixed-clamp-area clamp device 8 lifts the rear-fixed-clamp-area clamp guide plate 9 to implement transverse clamping and releasing of the rear-fixed-clamp-area clamp 10 along the inclined groove 14 (referring to FIG. 5 to FIG.).

1, 2, 3, . . . , n rear-fixed-clamp-area clamp devices 8 are provided. 2, 3, 4, . . . , n+1 front-movable-clamp-area clamps 5 are correspondingly provided. The rear-fixed-clamp-area clamp devices 8 and the front-movable-clamp-area clamps 5 are transversely distributed at an equal distance. The rear-fixed-clamp-area clamp guide plate 9 includes a front guide plate and a rear guide plate which are symmetrically arranged.

The rear-fixed-clamp-area connecting guiderail mechanisms 4 between the front movable clamp area 2 and the rear fixed clamp area 3 are connected through a transverse guiderail. The front-movable-clamp-area left-right moving plate 6 and the front-movable-clamp-area up-down moving plate 7 are connected through a longitudinal guiderail. The rear-fixed-clamp-area fixed plate 9 and the rear-fixed-clamp-area clamp guide plate 11 are connected through a longitudinal guiderail. The rear-fixed-clamp-area clamp 10 and the rear-fixed-clamp-area fixed plate 9 are connected through a transverse guiderail.

The front-movable-clamp-area clamp 5 implements clamping and releasing using a front-movable-clamp-area clamp power device 15.

The power devices and the clamp devices of the front movable clamp area 2 and the rear fixed clamp area 3 are controlled by a PLC pneumatically, hydraulically or electrically.

Figure 9:
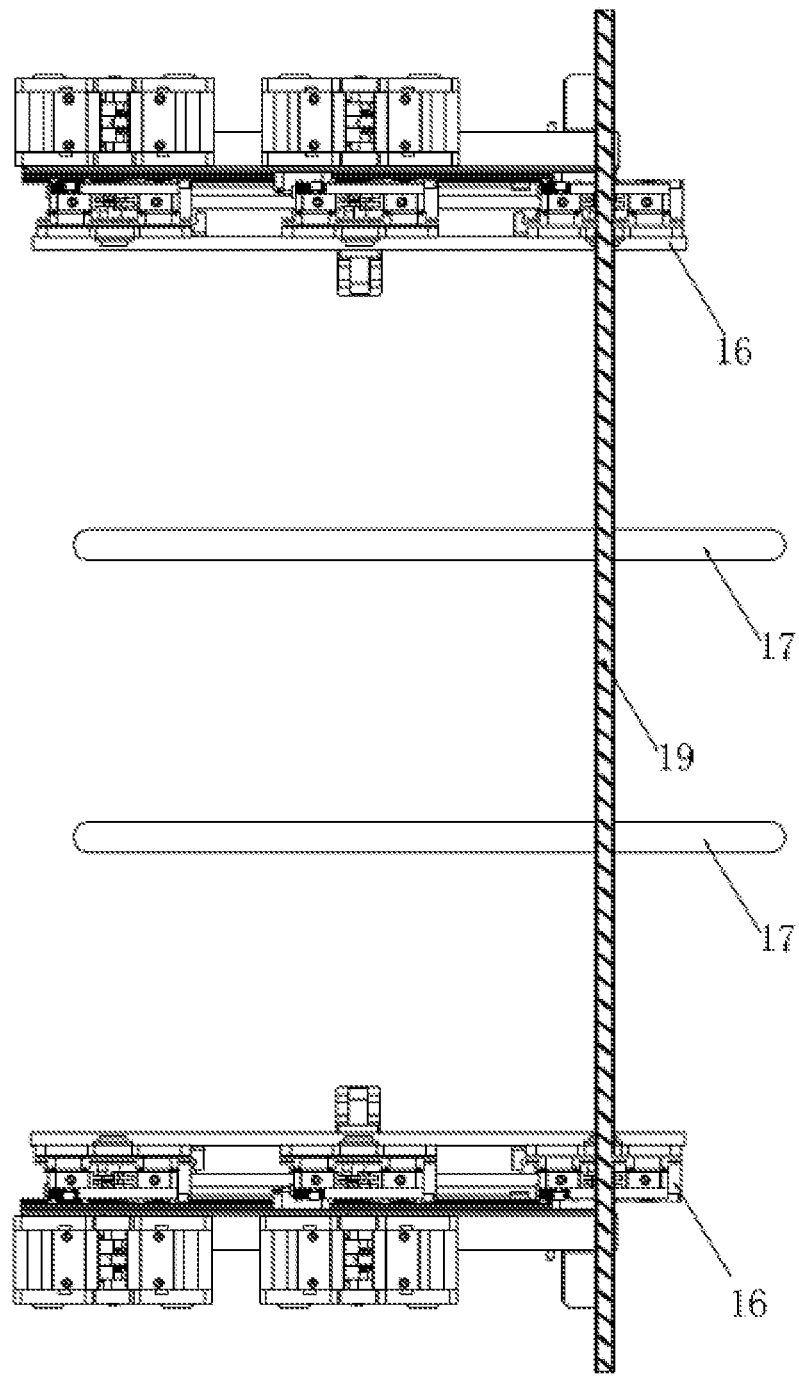
FIG. 9 is a schematic structural diagram of an equipment application state according to the present invention.
Figure 10:
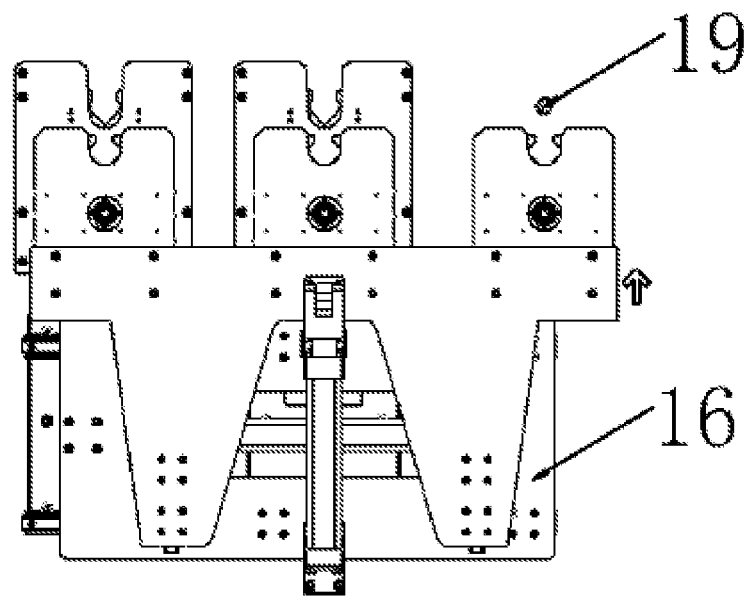
FIG. 10 is a schematic diagram of a first-step working state according to the present invention.

In FIG. 9, in actual use, it consists of two transverse transfer devices 16 and steel bar supports 17. The two transverse transfer devices 16 are disposed symmetrically. The steel bar supports 17 are located between the two transverse transfer devices 16. A steel bar 19 is placed at an initial position using the steel bar supports 17. A method for controlling steel bar transverse stepping transfer equipment includes the following steps:

In step 1: FIG. 10 is a diagram showing that the steel bar 17 is placed at the initial position. A front-movable-clamp-area clamp 5 is located at a lower end of the steel bar and is in an open state. A front-movable-clamp-area up-down moving plate 7 then drives the front-movable-clamp-area clamp 5 to ascend.

Figure 11:
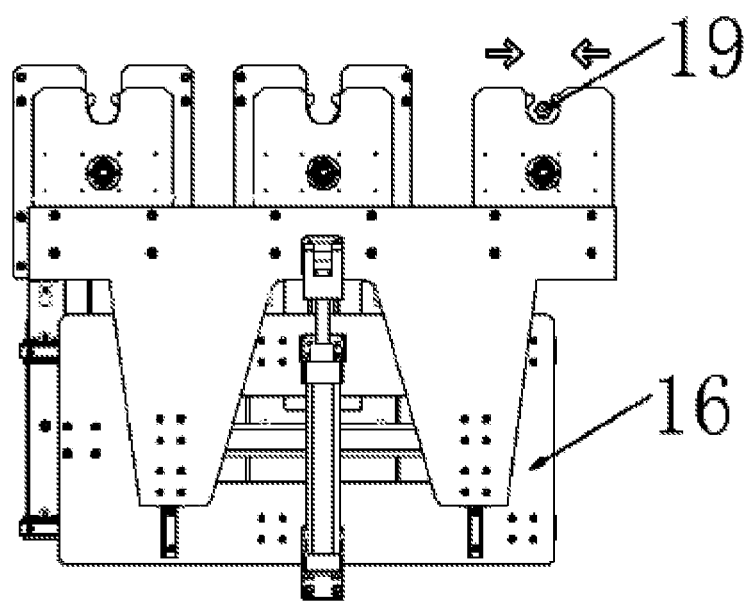
FIG. 11 is a schematic diagram of a second-step working state according to the present invention.
Figure 12:
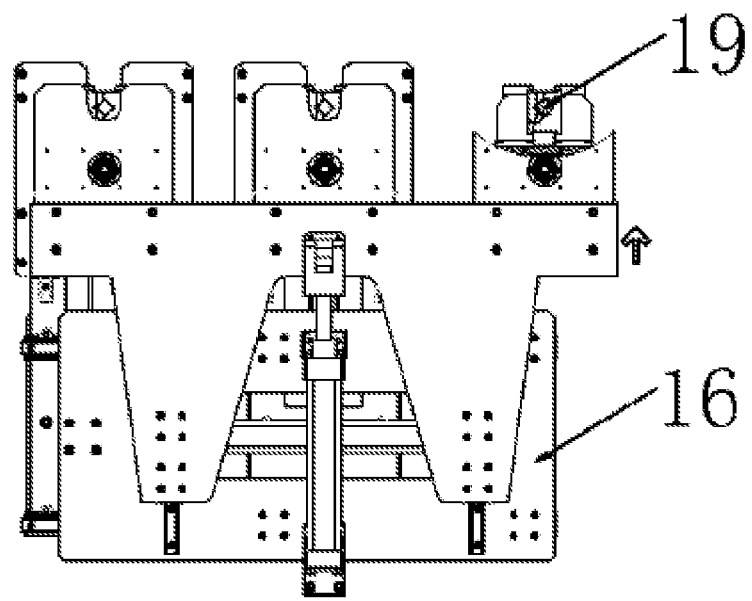
FIG. 12 is a schematic diagram of a third-step working state according to the present invention.

In step 2: The front-movable-clamp-area clamp 5 ascends to a position on a level with a rear-fixed-clamp-area clamp 10 and then performs a clamping movement (referring to FIG. 11). FIG. 12 is a partial sectional view of FIG. 11. The front-movable-clamp-area clamp 5 then holds the steel bar tightly to ascend together hydraulically.

Figure 13:
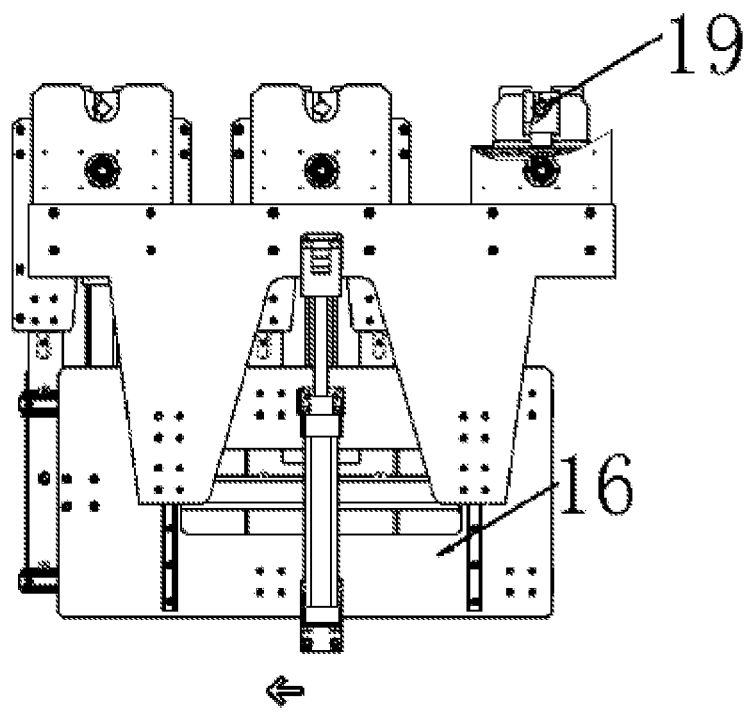
FIG. 13 is a schematic diagram of a fourth-step working state according to the present invention.

In step 3: In FIG. 13, the front-movable-clamp-area clamp 5 holds the steel bar 19 tightly, and they are lifted together to a highest position. A front-movable-clamp-area left-right moving plate 6 drives the front-movable-clamp-area clamp 5 and the steel bar to transfer together to the left.

Figure 14:
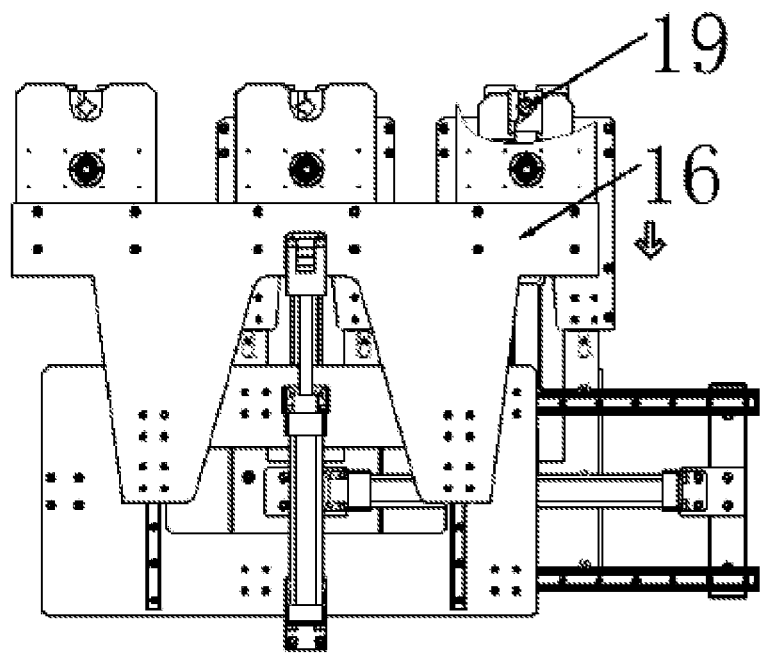
FIG. 14 is a schematic diagram of a fifth-step working state according to the present invention.

In step 4: In FIG. 14, the front-movable-clamp-area clamp 5 and the steel bar 19 are transferred together to the left. The front-movable-clamp-area up-down moving plate 7 then drives the front-movable-clamp-area clamp 5 and the steel bar to descend.

Figure 15:
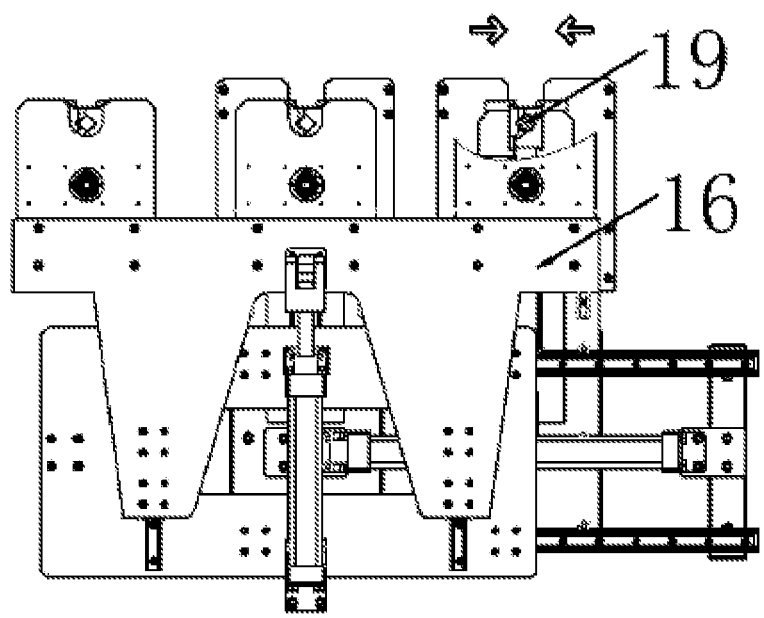
FIG. 15 is a schematic diagram of a sixth-step working state according to the present invention.
Figure 16:
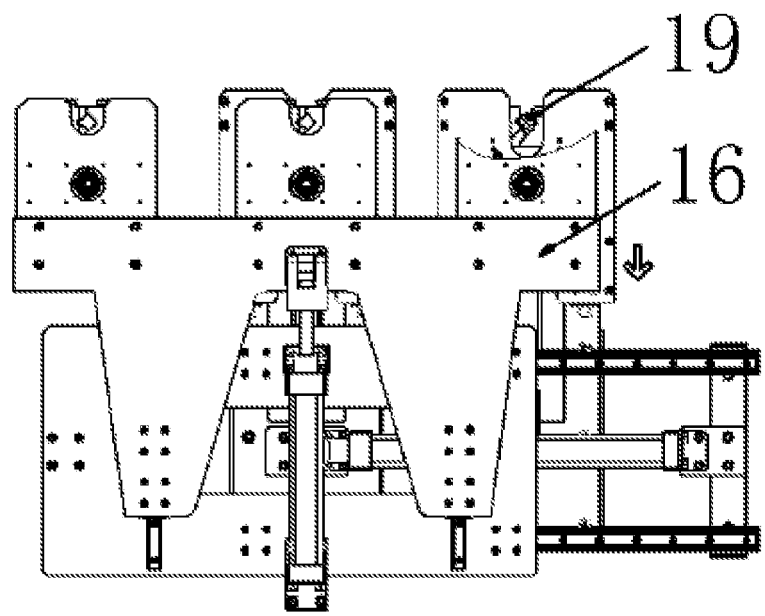
FIG. 16 is a schematic diagram of a seventh-step working state according to the present invention.

In step 5: In FIG. 15, the front-movable-clamp-area clamp 5 and the steel bar 19 descend to an opening position of the rear-fixed-clamp-area clamp 10. The rear-fixed-clamp-area clamp 10 holds the steel bar tightly. The front-movable-clamp-area clamp 5 then releases the steel bar. FIG. 16 is a partial sectional view of FIG. 15.

Figure 17:
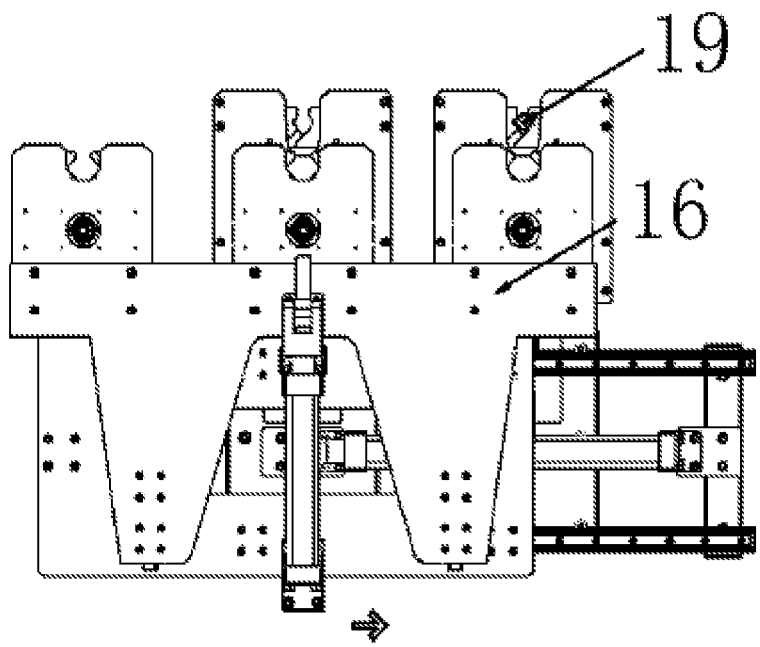
FIG. 17 is a schematic diagram of an eighth-step working state according to the present invention.
Figure 18:
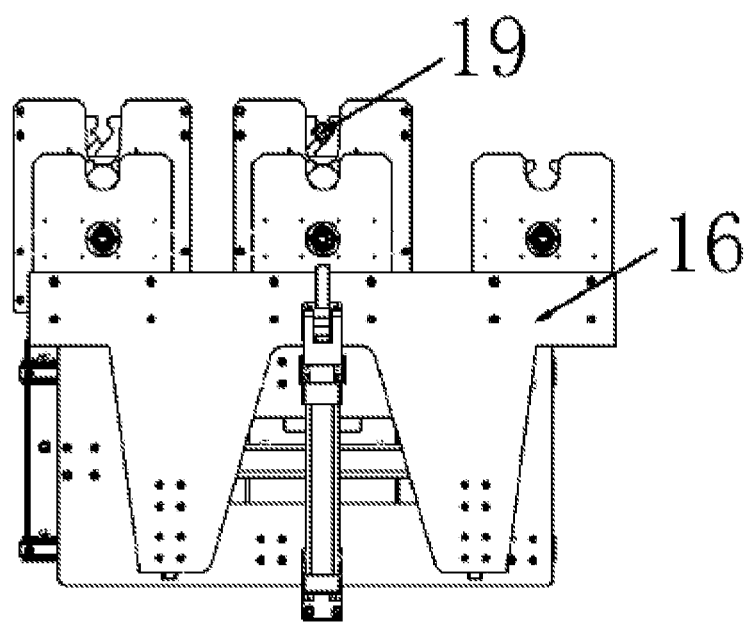
FIG. 18 is a schematic diagram of a ninth-step working state according to the present invention.

In step 6: In FIG. 17, the front-movable-clamp-area clamp 5 descends to a lowest position. In FIG. 18, the front-movable-clamp-area clamp 5 moves rightwards to an original position (that is, the position in FIG. 10).

In step 7: step 1 to step 6 are repeated, until the steel bar is transferred to a target position.

The equipment of the present invention is applicable to transverse transfer of steel bars with different lengths and is also applicable to step-by-step transfer of other long materials with any cross section.

What is claimed is:

1. A steel bar transverse stepping conveying equipment, comprising a base, wherein a front movable clamp area and a rear fixed clamp area are provided on the base, the front movable clamp area and the rear fixed clamp area are connected through rear-fixed-clamp-area connecting guiderail mechanisms to perform a relative translational movement;

the front movable clamp area comprises a front-movable-clamp-area clamp, a front-movable-clamp-area left-right moving plate, and a front-movable-clamp-area up-down moving plate; the front-movable-clamp-area clamp is fixedly connected to the front-movable-clamp-area up-down moving plate, and the front-movable-clamp-area left-right moving plate is mounted on a back surface of the front-movable-clamp-area up-down moving plate and is movably connected to the front-movable-clamp-area up-down moving plate; and the rear fixed clamp area comprises a rear-fixed-clamp-area clamp device and a rear-fixed-clamp-area fixed plate; the rear-fixed-clamp-area clamp device is mounted on the rear-fixed-clamp-area fixed plate; and the rear-fixed-clamp-area clamp device consists of a rear-fixed-clamp-area clamp and a rear-fixed-clamp-area clamp guide plate.

2. The steel bar transverse stepping conveying equipment according to claim 1, wherein an inclined groove is provided on the rear-fixed-clamp-area clamp guide plate, the rear-fixed-clamp-area clamp is embedded in the inclined groove, and a rear-fixed-clamp-area clamp power device of the rear-fixed-clamp-area clamp device lifts the rear-fixed-clamp-area clamp guide plate to implement transverse clamping and releasing of the rear-fixed-clamp-area clamp along the inclined groove.

3. The steel bar transverse stepping conveying equipment according to claim 1, wherein at least one rear-fixed-clamp-area clamp devices are provided in the rear fixed clamp area, and a plurality of front-movable-clamp-area clamps are correspondingly provided in the front movable clamp area; wherein, a number of the plurality of front-movable-clamp area clamps are one more than a number of the at least one rear-fixed-clamp-area clamps; and the rear-fixed-clamp-area clamp devices and the plurality of front-movable-clamp-area clamps are transversely distributed at an equal distance.

4. The steel bar transverse stepping conveying equipment according to claim 1, wherein the rear-fixed-clamp-area clamp guide plate consists of a front guide plate and a rear guide plate arranged symmetrically.

5. The steel bar transverse stepping conveying equipment according to claim 1, wherein the rear-fixed-clamp-area connecting guiderail mechanisms between the front movable clamp area and the rear fixed clamp area are connected through a first transverse guiderail; the front-movable-clamp-area left-right moving plate and the front-movable-clamp-area up-down moving plate are connected through a first longitudinal guiderail; the rear-fixed-clamp-area fixed plate and the rear-fixed-clamp-area clamp guide plate are connected through a second longitudinal guiderail; and the rear-fixed-clamp-area clamp and the rear-fixed-clamp-area fixed plate are connected through a second transverse guiderail.

6. The steel bar transverse stepping conveying equipment according to claim 1, wherein the front-movable-clamp-area clamp implements clamping and releasing using a front-movable-clamp-area clamp power device.

7. The steel bar transverse stepping conveying equipment according to claim 1, wherein power devices and clamp devices of the front movable clamp area and the rear fixed clamp area are controlled by a programmable logic controller (PLC) pneumatically, hydraulically or electrically.

8. The steel bar transverse stepping conveying equipment according to claim 2, wherein at least one rear-fixed-clamp-area clamp devices are provided in the rear fixed clamp area, and a plurality of front-movable-clamp-area clamps are correspondingly provided in the front movable clamp area; wherein, a number of the plurality of front-movable-clamp area clamps are one more than a number of the at least one rear-fixed-clamp-area clamps; and the rear-fixed-clamp-area clamp devices and the plurality of front-movable-clamp-area clamps are transversely distributed at an equal distance.

9. The steel bar transverse stepping conveying equipment according to claim 2, wherein the rear-fixed-clamp-area clamp guide plate consists of a front guide plate and a rear guide plate arranged symmetrically.

10. A method for controlling steel bar transverse stepping transfer equipment, comprising the following steps:

step 1: locating a front-movable-clamp-area clamp at a lower end of a steel bar and the front-movable-clamp-area clamp is in an open state, and then driving the front-movable-clamp-area clamp by a front-movable-clamp-area up-down moving plate to ascend the front-movable-clamp-area clamp;

step 2: after ascending the front-movable-clamp-area clamp to a position on a level with a rear-fixed-clamp-area clamp, performing a clamping movement, then holding the steel bar tightly by the front-movable-clamp-area clamp; and ascending the front-movable-clamp-area clamp and the steel bar together;

step 3: after ascending the front-movable-clamp-area clamp and the steel bar to a highest position, driving the front-movable-clamp-area clamp and the steel bar by a front-movable-clamp-area left-right moving plate to transfer the front-movable-clamp-area clamp and the steel bar together to the left;

step 4: after the front-movable-clamp-area clamp and the steel bar are transferred together to the left, driving the front-movable-clamp-area clamp and the steel bar by the front-movable-clamp-area up-down moving plate to descend the front-movable-clamp-area clamp and the steel bar;

(5) in step 5: after descending the front-movable-clamp-area clamp and the steel bar to an opening position of the rear-fixed-clamp-area clamp, holding the steel bar tightly by the rear-fixed-clamp-area clamp, and releasing the steel bar from the front-movable-clamp-area clamp;

step 6: descending the front-movable-clamp-area clamp to a lowest position, and moving the front-movable-clamp-area clamp rightward to an original position; and step 7: repeating step 1 to step 6 until the steel bar is transferred to a target position.

* * * * *